US 8,451,849 B2

(12) United States Patent
Oja et al.

(10) Patent No.: US 8,451,849 B2
(45) Date of Patent: May 28, 2013

(54) SESSION ESTABLISHMENT FOR REAL-TIME MEDIA COMMUNICATION SERVICE

(75) Inventors: Saku Oja, Helsinki (FI); Simo Hyytiä, Espoo (FI); Paavo Helenius, Toijala (FI); Bert Holtappels, Helsinki (FI); Andrew Rebeiro-Hargrave, Helsinki (FI); Ilkka Westman, Helsinki (FI)

(73) Assignee: Nokia Corporation, Espoo (FI)

( * ) Notice: Subject to any disclaimer, the term of this patent is extended or adjusted under 35 U.S.C. 154(b) by 2281 days.

(21) Appl. No.: 10/882,674

(22) Filed: Jul. 2, 2004

(65) Prior Publication Data
US 2005/0254510 A1 Nov. 17, 2005

(30) Foreign Application Priority Data
May 12, 2004 (FI) ...................................... 20045175

(51) Int. Cl.
*H04L 12/28* (2006.01)
(52) U.S. Cl.
USPC ........ 370/401; 370/395.2; 370/252; 370/260; 370/410; 370/386; 370/381; 370/328; 370/236; 370/353; 370/911; 455/517; 455/552.1; 709/227; 709/222
(58) Field of Classification Search
USPC ................ 455/517, 518, 519, 90.2, 507, 415, 455/552.1; 709/227, 204, 205, 206, 217, 709/222; 370/352, 395.2, 252, 260, 401, 370/410, 386, 381, 328, 236, 353, 911
See application file for complete search history.

(56) References Cited

U.S. PATENT DOCUMENTS

| 7,027,582 | B2 * | 4/2006 | Khello et al. | 379/220.01 |
| 7,042,871 | B2 * | 5/2006 | Gallant et al. | 370/352 |
| 7,130,282 | B2 * | 10/2006 | Black | 370/296 |
| 2003/0007482 | A1 | 1/2003 | Khello et al. | |
| 2004/0192364 | A1 * | 9/2004 | Ranalli et al. | 455/517 |
| 2004/0240452 | A1 * | 12/2004 | Klaghofer et al. | 370/395.21 |
| 2005/0027867 | A1 * | 2/2005 | Mueller et al. | 709/227 |
| 2007/0097879 | A1 * | 5/2007 | Bleckert et al. | 370/254 |

FOREIGN PATENT DOCUMENTS

| WO | WO 02/33913 A1 | 4/2002 |
| WO | WO 2005/025255 A1 | 3/2005 |

* cited by examiner

*Primary Examiner* — Kibrom T Hailu
(74) *Attorney, Agent, or Firm* — Alston & Bird LLP

(57) ABSTRACT

A solution for establishing a session of a real-time media communication service in a communication system comprising at least two separately administered subsystems. The session establishment comprises receiving a request for session initiation, querying subscriber information related to the requested session, and initiating the session according to the queried subscriber information. The invented method comprises detecting that the terminating subscriber does not belong to the same subsystem as the originating subscriber, determining a defined transit server associated with the terminating subscriber, said transit server having access to a subscriber database of the subsystem of the terminating subscriber, and querying subscriber information related to the requested session with a first control message comprising parameters of the requested session to the transit server. The solution allows a connection to be established between users of a real-time media communication service for subscribers of separate administrative subsystems so that operators of each subsystem may possess full control of their own network elements, and the internal connection establishment procedures need minimal alterations for the functionality.

35 Claims, 2 Drawing Sheets

SESSION ESTABLISHMENT FOR REAL-TIME MEDIA COMMUNICATION SERVICE

FIELD OF THE INVENTION

The present invention relates to telecommunications, and especially to establishing a session for a real-time communication service between subscribers of separately administered subsystems.

BACKGROUND OF THE INVENTION

Push to talk over Cellular (PoC) is a new telecommunication service that enables real-time one-to-one and one-to-many (group) voice communication in a cellular network. PoC can be provided as a packet-based user or application level service in a digital communication system. In PoC, the underlying communication system provides the basic connections (i.e. IP connections) between the communications applications in user terminals and a communication service.

Due to the great interest in the PoC services, individual vendors have provided early adoptions of the emerging technology, primarily in the form of standalone PoC systems. Quite recently, a group of interested organizations prepared an industry specification for PoC, with the aims of following existing $3^{rd}$ Generation Partnership Project (3GPP) IP Multimedia Subsystem (IMS) specifications. The standardization work to this direction has since then continued in Open Mobile Alliance (OMA) using the existing set of specifications as a starting point. A shared interest is presently to integrate the separate existing and future PoC systems in such a way that PoC users could utilize the service in wide areas and among a large subscriber base without continually concerning themselves with the separately operated administrative domains.

A PoC communication service is typically implemented with a communication server system while client applications reside in the user equipment or terminals. Establishment of connections in a PoC system is implemented using the mechanisms of a Session Initiation Protocol (SIP). The SIP protocols comprise querying routing information for the signalling messages from defined databases of the system. During establishment of sessions, such queries are generally implemented based on the identity of the calling and/or the called subscriber and therefore any queried server, in this case the address server, needs to possess the information concerning both the calling and the called subscriber. This, however, may be problematic if the calling and the called subscriber do not belong to the same administrative domain.

Cellular operators are used to operating autonomously within the framework of the standard interfaces, and having full control over their network elements. Operators prefer to controllably integrate separately administered subsystems by means of negotiated roaming contracts, and especially access to subscriber information is traditionally very conservatively shared. Therefore, introduction of any session establishment mechanism that requires close co-operation and continuous sharing of subscriber related information between the competing network operators is likely to face serious problems.

On the other hand, establishment of sessions in the already specified or implemented systems follows a thoroughly specified procedure, and any alterations to the elements that implement the service or to the existing network specifications are challenging, especially if the installed base is already considerable. Furthermore, changes to the functional elements of the underlying communications systems are to be considered almost impossible.

BRIEF DESCRIPTION OF THE INVENTION

It is thus an object of the present invention to provide a solution to facilitate connection establishment for a real-time media communication service between two separately operated administrative domains in a way that allows easy adoption to the installed base as well as to future installations. The objects of the invention are achieved by a method, communication system, server, and computer program. The method, communication system, server, and computer program are arranged to receive a request for session initiation, query subscriber information related to the requested session, initiate the requested session according to the queried subscriber information, detect that a terminating subscriber does not belong to the same subsystem as an originating subscriber, determine the defined transit server associated with the terminating subscriber said transit server having access to a subscriber database of a subsystem of the terminating subscriber, and query subscriber information related to the requested session with a first control message which includes parameters of the requested session to the transit server.

The invention is based on the idea of associating with subscriber information on a user of a real-time media communication service a transit server functionality that belongs to the subscriber's administrative subsystem. A query mechanism towards a transit server is established for retrieving subscriber related information for establishing a session through the transit server by a server of another administrative subsystem.

An advantage of the invention is that it allows connections to be established between users of a real-time media communication service for subscribers of separate administrative subsystems such that operators of each subsystem may possess full control of their own network elements, and the internal connection establishment procedures need minimal alterations for the functionality.

BRIEF DESCRIPTION OF THE DRAWINGS

In the following, the invention will be described in greater detail by means of preferred embodiments and with reference to the attached drawings, in which.

DETAILED DESCRIPTION OF THE INVENTION

The invention is applicable to any communication system capable of providing a packet based real-time media communication service. Such systems include mobile communication systems as well as fixed telecommunication systems. In the following, the present invention will be described by means of a Push-to-talk over Cellular (PoC) media communication service in a third generation mobile communication system, without limiting the invention to this specific service or the terms used in the description of the embodiment.

Figure 1:
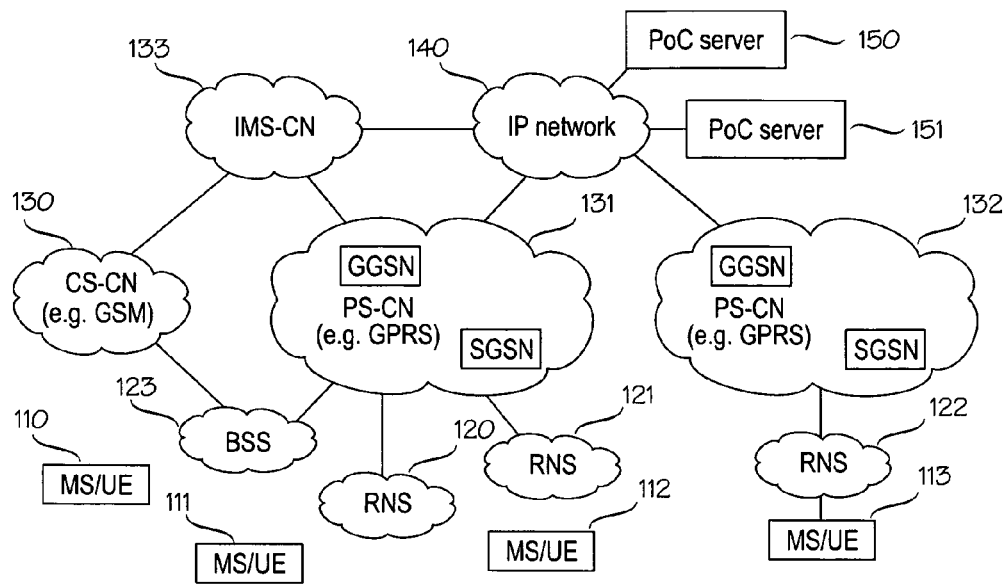
FIG. 1 is a block chart illustrating a communication system capable of providing a real-time media communication service.

As illustrated in FIG. 1, in the third generation (3G) mobile communications systems, a public land mobile network (PLMN) infrastructure may be logically divided into core network (CN) 130, 131, 132, 133 and access network (AN) infrastructures 120, 121, 122, 123. The access network AN may be called a base station subsystem (BSS) 123 for GSM and radio network subsystem (RNS) or a radio access network (RAN) 120, 121, 122 for UMTS. In the technical specifications of a third generation partnership project (3GPP), the core network CN is logically divided into a circuit switched (CS) domain 130, a packet switched (PS) domain 131, 132 and an IP multimedia subsystem (IMS) 133. The CS domain refers to a set of all CN entities offering a circuit switched type of connection for user traffic as well as all the entities supporting the related signalling. A circuit switched type of connection is a connection for which dedicated network resources are allocated upon connection establishment and released upon connection release. A packet switched type of connection transports user information using packets so that each packet can be routed independently of a previous one. Examples of the PS domain include GPRS (General Packet Radio Service), and typical entities include a serving GPRS support node (SGSN) and a gateway GPRS support node (GGSN). The IP multimedia subsystem comprises CN elements for provision of multimedia services. The IP multimedia subsystem IMS 133 utilizes the PS domain to transport multimedia signalling and bearer traffic.

More specifically, in voice communication with a "push to talk/release to listen" feature, a call is based on the use of a pressel (push-to-talk switch) in a telephone as a switch: by pressing a pressel the user indicates his/her desire to speak, and the user equipment sends a service request to the network. Alternatively, a voice activity detector (VAD) or any suitable means can be used instead of the manual switch. The network either rejects the request or allocates the requested resources on the basis of predetermined criteria, such as availability of resources, priority of the requesting user, etc. At the same time, a connection is also established to a receiving user, or users in the case of group communication. After the voice connection has been established, the requesting user can talk and the other users can listen. When the user releases the pressel, or in the case of traffic inactivity, the event is detected in the network, and the resources may be released and/or a talk item may be granted to another user.

In FIG. 1, a Push-to-talk Over Cellular (PoC) server system is illustrated as provided on top of a Packet Switched (PS) core network 131, 132, 133 in order to provide packet mode (e.g. IP) communication services to User Equipment (UE) 110, 111, 112, 113. UE accessing the PS CN, and the PS core network itself, utilizes the services provided by a Radio network subsystem (RNS) or Radio access network (RAN) 120, 121, 122, 123 to provide packet-mode communication between the UE and a PS CN subsystem. The multiple access method employed in an air interface in the RAN may be Time Division Multiple Access (TDMA), Frequency Division Multiple Access (FDMA), Code Division Multiple Access (CDMA), or a combination thereof. In the $3^{rd}$ and higher generation mobile communications system, the access method is primarily based on the CDMA. Further, because the traffic channels may have a wide bandwidth, corresponding to user data rates e.g. up to 2 Mbits/s, such access may also be referred to as a Wideband CDMA (WCDMA).

Conceptually, a packet based media communication system is provided on top of the mobile network in order to provide media communication services to user equipment UE through the communication system. The media communication system may be embodied as a server system, and it is generally referred to as a media communication server. A communication system may comprise a plurality of media communication servers 150, 151.

Consequently, in this embodiment the role of media communication servers is provided by PoC servers. A PoC Server is a media communication server that may act, according to the application, as the end-point of SIP, Real-time Transport protocol (RTP) and Real-time Transport Control Protocol (RTCP) signaling, provide SIP session handling, policy control for access to groups, group session handling, access control, do-not-disturb functionality, floor control functionality, talker identification, participants information, quality feedback, charging reports and media distribution. The PoC server may also include a subscriber and group management function (SGMF) for managing the subscriber and group data. It may also provide specific tools and interfaces needed for subscriber and group provisioning. Such tools or interfaces may include a WWW based control interface accessible using a standard web browser. The SGMF may also have a database for storing user and group information. The SGMF provides the information to the control-plane functions when needed, for example during a group attachment.

A PoC server 150, 151 in FIG. 1 thus illustrates a server comprising a group of management plane functions, control-plane functions and user-plane functions for implementing a PoC service. For a person skilled in the art, it is clear that the term PoC server may be interpreted to refer to a single PoC server or to a PoC server system comprising a combination of a PoC server and other specified logical entities of a PoC system architecture.

The management plane functions comprise operations, administration, maintenance and provisioning, which may be implemented by a combination of capabilities in the network elements and operation systems. Control plane functions comprise signalling functions necessary to set up, supervise, and release calls and connections. Since both group and user specific requirements are needed, the control plane in PoC includes a User Control Plane Function and a Group Control Plane Function. The user plane functions take care of voice packets coming from a subscriber over the underlying network.

In this embodiment, the invention is described by means of a simplified call setup in a prior art PoC system, without limiting the invention to this specific session establishment or the messages used therein. The call setup is illustrated as steps of a signalling block chart of FIG. 2 where functional entities involved in call setup in a communication server system are shown as separate logical elements.

According to the specifications, for call setup, a calling subscriber 20 sends a SIP INVITE message (step 2.1) addressed to a defined User Control Server 22, hereinafter referred to as UCS-O. UCS-O 22 here denotes a control plane functional entity that handles control actions and end-user signalling transactions in one-to-one calls, and communicates with end-user terminals using a session initiation protocol (SIP). The message is routed through a User Traffic Server 21 of the calling subscriber, hereinafter referred to as UTS-O. UTS-O 21 here denotes a user plane functional entity that handles speech packets coming from and going to end-users' terminals in one-to-one calls. UTS-O 21 communicates with end-user terminals using, for example, a real-time transport protocol (RTP) or a corresponding proprietary streaming transport protocol. UTS-O 21 routes the message to UTS-O 22 (step 2.2). For authorizing the call setup and retrieving relevant routing and subscriber information, UCS-O 22 sends a query (step 2.3) to an Authorization Server 23 assigned to it, hereinafter referred to as AuS-O. AuS-O 23 here denotes a management plane functional entity that handles and maintains static end-user data. In order to acquire mapping information needed to locate the authorisation server of the called subscriber, AuS-O 23 sends a query (step 2.4) comprising the identity of the called subscriber to an Address Server (AdS) 24 assigned to it. In its response, AdS 24 returns (step 2.5) the address of AuS-T 25 of the called subscriber. AuS-O 23 sends a query (step 2.6) comprising the identity of the called subscriber to AuS-T 25, and receives in the response (step 2.7) the address of UCS-T 26 of the called subscriber, e.g. in the form of the host name of UCS-T 26. The address of UCS-T 26 is forwarded (step 2.8) to UCS-O 22. From here on, the call setup proceeds normally according to the SIP INVITE procedure (step 2.9) via UCS-T 26 and UTS-T 27 of the called subscriber to the PoC client in the user equipment of the called subscriber (steps 2.10, 2.11).

As long as the calling subscriber and the called subscriber are in the same administrative domain, AdS 24 recognizes the subscriber and is able to return the associated address of AuS 25 of the called subscriber to the querying AuS 23 of the calling subscriber. If, however, the calling and the called subscribers belong to different administrative domains, as shown with a dashed line in FIG. 2, AdS is able to provide the queried information only if the operator of the called subscriber provides and maintains the information available to the network element of the calling subscriber.

Figure 2:
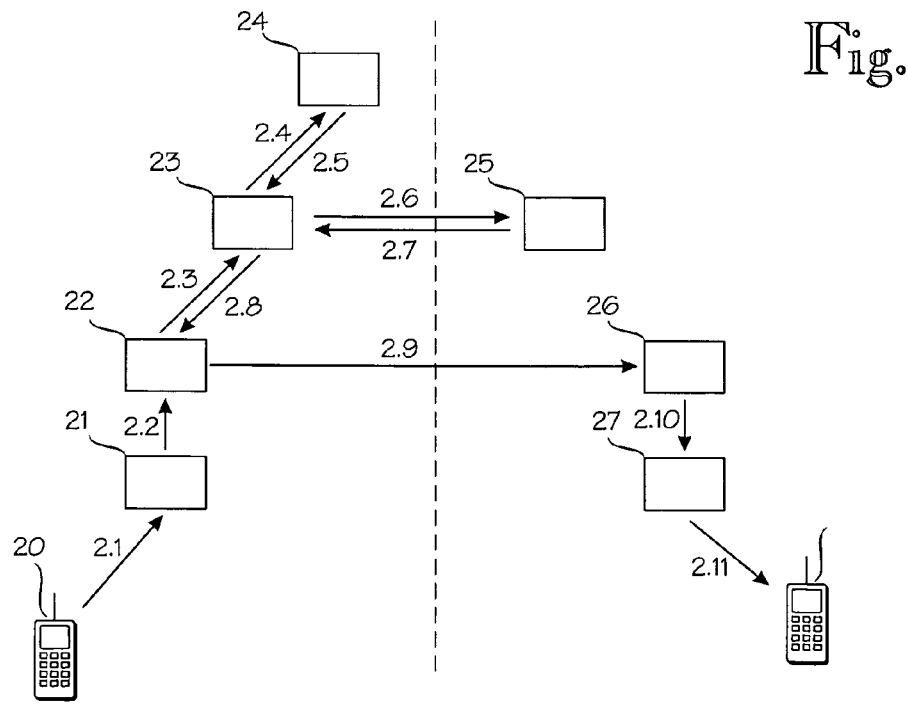
FIG. 2 is a signalling block chart illustrating call setup in a prior art standalone PoC system.
Figure 3:
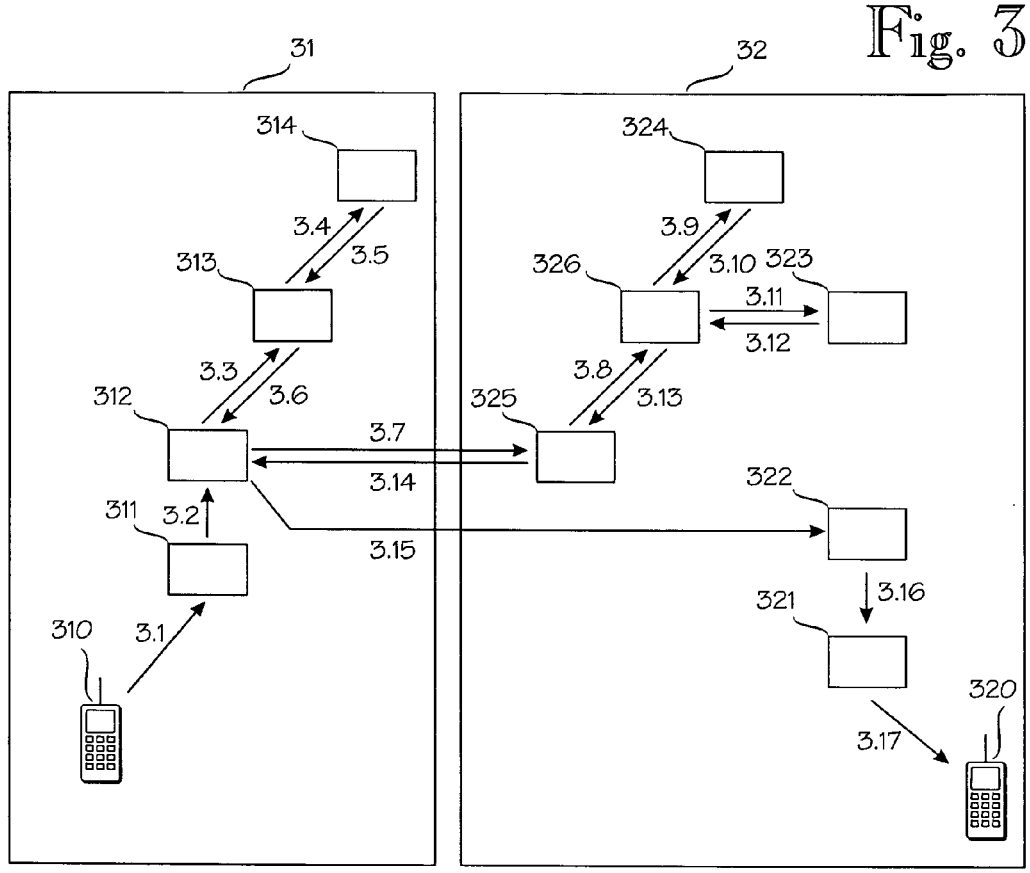
FIG. 3 is a signalling block chart of the call setup in a system according to the present invention.

FIG. 3 illustrates the invented solution by means of a signalling block chart of the call setup in a PoC system according to the present invention. In this example, a calling subscriber 310 and a called subscriber 320 belong to different administrative subsystems 31, 32. Steps 3.1 to 3.4 correspond directly to steps 2.1 to 2.4 of FIG. 2, wherein for call setup, a calling subscriber 310 sends a SIP INVITE message (step 3.1) via a defined User Traffic Server (UTS-O) 311 of the calling subscriber to a defined User Control Server (UCS-O) 312 (step 3.2) of the calling subscriber. UCS-O 312 sends a query (step 3.3) to an Authorization Server (AuS-O) 313 assigned to it. AuS-O 313 sends a query (step 3.4) comprising the identity of the called subscriber 320 to an Address Server (AdS-O) 314 assigned to it. However, the AdS-O 314 does not recognize the user identity comprised in the query, and returns (step 3.5) a message indicating that the request user identity was not found. AuS-O 313 forwards (step 3.6) the message to UCS-O 312. In response to the message, UCS-O 312 initiates a user identification domain part analysis. The analysis leads to an operator 32 of the called subscriber 320.

According to the invention, there is an assigned server, included in or integrated into the subsystem of the called subscriber, that acts as a transit server in session establishment to the called subscriber. In the present embodiment, subscriber identification comprises the user identity part and the operator domain part, and the assigned transit server is a defined server acting as a transit server for the subscribers in the administrative subsystem of the operator 32 of the called subscriber 320. Therefore, the transit server has administrative access to the subscriber databases of the operator 32 of the called subscriber 320, administrative access in this context referring to the fact that a defined subscriber database and the transit server belong to the same administrative domain, or two domains that are administratively integrated together. In the embodied case, the address of the transit server can be determined based on the analysis of the domain part of the subscriber information. For a person skilled in the art, it is clear that the subscriber identification may comprise other type of information, and that the identity of the assigned transit server needs to be determined based on any type of the subscriber information or of a part thereof. For example, UCS-O may have access to a database comprising mapping information between subscriber identities (e.g. mobile subscriber number spaces) and transit server identities. However, the transit server does not necessarily need to be in the same administrative domain as the called subscriber. For example, an international operator may own several networks that are generally operated as separate administrative domains, but are loosely integrated by means of special management functions that enable use of a shared transit server for PoC users of the operator.

According to the information, UCS-O 312 generates a SIP message and sends it to the determined transit server UCS-Tr (step 3.7). The SIP message is advantageously of a type to facilitate transfer of embedded payload, and the session related information is encapsulated into the payload of the SIP message. In this embodiment, a mechanism based on SIP OPTIONS is described. SIP OPTIONS mechanism is described in section 11 of the Internet Engineering task Force (IETF) RFC document 3261, which is publicly available and incorporated herein as a reference.

In general, SIP method OPTIONS allow a user agent to query another user agent or a proxy server as to its capabilities. This allows a client to discover information about the supported methods, content types, extensions, codecs, etc. without actually "ringing" the other party. The target of the OPTIONS request is identified by Request-URI, which could identify another user agent or a SIP server. An OPTIONS request is constructed using the standard rules for a SIP request, and comprises an accept header field to indicate the type of message body the user agent wishes to receive in the response. Typically, this is set to a format that is used to describe the media capabilities of a user agent, such as a Session Description Protocol (application/sdp). Also a response to an OPTIONS is constructed using the standard rules for a SIP response. An OPTIONS request received within a dialog generates a 200 (OK) response. A message body may be sent, the type of which is determined by the Accept header field in the OPTIONS request (application/sdp is the default if the Accept header field is not present).

In this embodiment, the SIP OPTIONS message and the related 200 (OK) response have a message body of the type application/poc+xml. This payload encapsulates the PoC specific parameters to enable PoC connection establishment between the operators. XML here refers to an extensible markup language, which describes a class of data objects called XML documents and partially describes the behaviour of computer programs that process them. XML can be used for designing text formats for structured data (for example, spreadsheets, address books, configuration parameters, financial transactions and technical drawings), and producing files that are easy to generate and read by a computer. The exemplary XML payload in the embodied SIP message may comprise lines:

```
<?xml version=" 1.0" ?>
<nnirequest xmlns=" [Namespace]"
    nniversion=" [PoC version]"
    requesttype=" [Request type]" >
</nnirequest>
``` where the [Namespace] carries information for identifying the target, i.e. here comprises the identification information on the called subscriber. [PoC version] indicates the software version level of the system and [request type] comprises a token presenting the requested service type, in this embodiment the one-to-one call. For a person skilled in the art it is clear that other service types are also possible, for example a group attachment or a callback request.

Upon receiving the SIP OPTIONS request, transit UCS-Tr 325 performs a normal query for subscriber information related to the session, corresponding to the steps 2.3 to 2.8 of FIG. 2. It should be noted that the term subscriber information does not relate only to parameters and definitions stored by the management system, but to any kind of information that is maintained in the databases of the communication system and may be retrieved based on the identity of the subscriber. Such information may include, for example, routing information indicating network elements that currently serve the target subscriber. Transit UCS 325 sends a query (step 3.8) to a first Authorization Server (AuS) 326 assigned to it. The first AuS 326 sends the query (step 3.9) to the Address Server (AdS-T) 324 of the operator 32 of the called subscriber 320. In its response, AdS-T 324 returns (step 3.10) the address of the second AuS 323 that handles and maintains end-user data of the called subscriber. The first AuS 326 sends a query (step 3.11) comprising the identity of the called subscriber to the second AuS 323, and receives in the response (step 3.12) the address of UCS-T 322 of the called subscriber, e.g. in the form of the host name of UCS-T 322. The address of UCS-T 322 is forwarded (steps 3.13) to transit server UCS-Tr 325 and sent to UCS-O 312 of the calling subscriber in a SIP 200 (OK) response (step 3.14). The corresponding embodied XML payload in SIP 200 (OK) response may include, in the case of callback request:

```
<?xml version=" 1.0" ?>
<nniresponse xmlns=" [Namespace]"
    nniversion=" [PoC version]"
    requesttype=" 1"
    resource=" [Contact IP address]"
</nniresponse>
``` where [Contact IP address] indicates the address of a target server in the network of the called subscriber.

For group attachment the payload may comprise, for example:

```
<?xml version=" 1.0" ?>
<nniresponse xmlns=" [Namespace]"
    nniversion=" [PoC version]"
    requesttype=" 2"
    resource=" [Contact IP address]" >
</nniresponse>
```

For one-to-one call the payload may comprise:

```
<?xml version=" 1.0" ?>
<nniresponse xmlns=" [Namespace]"
    nniversion=" [PoC version]"
    requesttype=" 3"
    resource=" [Contact IP address]"
    answermode=" [One-to-one answer mode]" >
</nniresponse>
``` where [One-to-one answermode] indicates the answer mode (for example, automatic or manual) of the called subscriber.

Upon receiving the address of UCS-T 322, UCS-O 312 in the network of the calling subscriber is able to send the SIP INVITE message (step 3.15) to the correct UCS-T 322 in the destination network, and the call setup may continue normally by forwarding the SIP INVITE via the UTS 321 of the called subscriber (step 3.16) to the PoC client in the user equipment 320 of the called subscriber (step 3.17).

With the above arrangement, connection establishment for the real-time media communication service between two subscribers in different administrative domains may be facilitated by a simple query mechanism that at the minimum needs to be updated to the control plane functional elements in the server system implementing the real-time media communication service. The operators of the administrative domains maintain control over their network elements and subscriber information, and do not need to introduce new elements, routing databases and establish additional mechanisms between them.

Another alternative for exchanging information between UCS 312 of the calling subscriber and the transit server 325 is to utilize a SIP MESSAGE mechanism in the query, and SIP 300 Multiple Choices in the response. In general, a SIP MESSAGE method is an extension to the Session Initiation Protocol (SIP) that allows transfer of Instant Messages. SIP MESSAGE requests carry the contents in the form of multipurpose Internet mail extension (MIME) body parts. SIP MESSAGE requests do not themselves initiate a SIP dialog; during normal usage each Instant Message stands alone, much like pager messages. MESSAGE requests may be sent in the context of a dialog initiated by another SIP request. SIP MESSAGE requests normally carry the instant message content in the request body. On the other hand, 3xx responses give information about the user's new location, or about alternative services that might be able to satisfy the call. The address in the request resolved to several choices, each with its own specific location, and the user can select a preferred communication end point and redirect its request to that location. The response may include a message body containing a list of resource characteristics and locations from which the user can choose the most appropriate one, if allowed by the Accept request header field.

A further alternative for exchanging information between UCS 312 of the calling subscriber and the transit server 325 is to utilize a SIP OPTIONS mechanism in the query, and SIP 300 Multiple Choices in the response.

Figure 4:
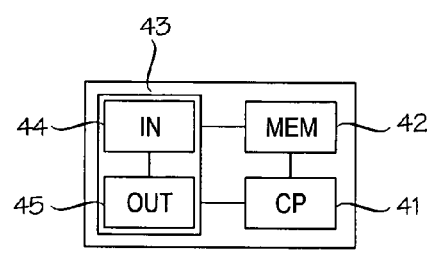
FIG. 4 is a block diagram illustrating functional elements of an embodied PoC Group and List Management Server.

The implementation of the described mechanisms in a PoC Server is illustrated with reference to FIG. 4. By definition, a server is a computer that serves other computers in the same network by operating as the other computers request. FIG. 4 provides a description of a PoC Server that performs one or more of the previously described server functions. The PoC Server comprises processing means 41, an element that comprises an arithmetic logic unit, a number of special registers and control circuits. Connected to the processing means are memory means 42, a data medium where computer-readable data or programs or user data can be stored. The memory means typically comprise memory units that allow both reading and writing (RAM), and a memory whose contents can only be read (ROM). The unit also comprises an interface block 43 with input means 44 for inputting data for internal processing in the unit, and output means 45 for outputting data from the internal processes of the unit. Examples of said input means comprise a plug-in unit acting as a gateway for information delivered to its external connection points. For receiving information from the operator, the PoC Server may also comprise a keypad, or a touch screen, a microphone, or the like. Examples of said output means include a plug-in unit feeding information to the lines connected to its external connection points. For outputting information to the operator of the PoC Server, they may also comprise a screen, a touch screen, a loudspeaker, or the like. The processing means 41, memory means 42, and interface block 43 are electrically interconnected for performing systematic execution of operations on the received and/or stored data according to the predefined, essentially programmed processes of the unit. In a solution according to the invention, the operations comprise a functionality for implementing the operations of the PoC described above.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising: receiving, in a server, a request for session initiation, wherein the session is a session of a real-time media communication service; detecting, in the server, that a terminating subscriber does not belong to a same subsystem as an originating subscriber; maintaining, in the server, transit server information that associates a group of subscribers with a transit server, wherein the association is based on identification information of subscriber and said transit server has access to a subscriber database of a subsystem of the associated terminating subscriber; determining, in the server, in response to detecting that the terminating subscriber does not belong to the same subsystem as the originating subscriber, with identification information on the terminating subscriber included in the request for session initiation, the transit server associated with the terminating subscriber; querying subscriber information related to the requested session with a first control message from the server to the transit server, wherein the first control message comprises parameters of the requested session; and initiating, in the server, the requested session according to the queried subscriber information.

2. A method according to claim 1, further comprising:
retrieving, in response to a received control message, the subscriber information from the subscriber database of the subsystem of the terminating subscriber; and
returning a second control message comprising the queried session related subscriber information.

3. A method according to claim 1, further comprising:
establishing said requested session of the real-time media communication service according to a session initiation protocol; and
carrying the real-time media communication service related information in a payload of session initiation protocol messages.

4. A method according to claim 2, wherein said first control message comprises a SIP OPTIONS message and said second control message comprises a SIP 200 OK message.

5. A method according to claim 2, wherein said first control message comprises a SIP OPTIONS message and said second control message comprises a SIP 300 multiple choices message.

6. A method according to claim 2, wherein said first control message comprises a SIP MESSAGE message and said second control message comprises a SIP 300 multiple choices message.

7. A method according to claim 1, wherein the querying of said subscriber information related to the requested session comprises querying an identity of a user control server of the terminating subscriber, and wherein the initiating the requested session comprises sending a request to the user control server of the terminating subscriber.

8. A method according to claim 1, wherein the determining of a defined transit server associated with the terminating subscriber comprises determining a pre-defined user control server in the subsystem of the terminating subscriber.

9. A method according to claim 1, wherein the determining of a defined transit server associated with the terminating subscriber comprises determining a pre-defined server in a third subsystem administratively integrated to the subsystem of the terminating subscriber.

10. A system, comprising: a first server and a transit server, the transit server having access to a subscriber database of one or more subsystems, wherein the first server is configured to receive a request for session initiation of a real-time media communication service, detect that a terminating subscriber does not belong to a same subsystem as an originating subscriber, maintain transit server information that associates a group of subscribers with a transit server, wherein the association is based on identification information on subscriber, and said transit server has access to a subscriber database of a subsystem of the terminating subscriber, determine, in response to detecting that the terminating subscriber does not belong to the same subsystem as the originating subscriber, with identification information on the terminating subscriber included in the request for session initiation, the transit server associated with the terminating subscriber, and query subscriber information related to the requested session with a first control message comprising parameters of the requested session to the transit server, and said transit server is configured to retrieve, in response to a received control message, the subscriber information from the subscriber database of the subsystem of the terminating subscriber, and return a second control message comprising the queried session related subscriber information and initiate the session according to the queried subscriber information.

11. A system according to claim 10, wherein said subsystems are configured to establish said requested session of a real-time media communication service according to a session initiation protocol, and to carry the real-time media communication service related information in a payload of session initiation protocol messages.

12. A system according to claim 10, wherein said subscriber information related to the requested session comprises an identity of a user control server of the terminating subscriber, and wherein the session initiator is configured to initiate the session by sending a request to the user control server of the terminating subscriber.

13. A system according to claim 10, wherein said transit server comprises a pre-defined user control server in the subsystem of the terminating subscriber.

14. A system according to claim 10, wherein said transit server comprises a pre-defined server accessible to the subsystem of the terminating subscriber.

15. An apparatus, comprising: a processor configured to receive a request for session initiation of a real-time media communication service; detect that a terminating subscriber does not belong to a same subsystem as an originating subscriber, maintain transit server information that associates a group of subscribers with a transit server, wherein the association is based on identification information on subscriber, and said transit server has access to a subscriber database of a subsystem of the terminating subscriber, determine, in response to detecting that the terminating subscriber does not belong to the same subsystem as the originating subscriber, with identification information on the terminating subscriber included in the request for session initiation, the transit server associated with the terminating subscriber, query subscriber information related to the requested session with a first control message to the transit server, wherein the first control message comprises parameters of the requested session, receive, from the transit server, a second control message comprising the queried session related subscriber information, and initiate the requested session according to the queried subscriber information.

16. An apparatus according to claim 15, wherein the subsystems are configured to establish said requested session of the real-time media communication service according to a session initiation protocol, and carry the real-time media communication service related information in the payload of the session initiation protocol messages.

17. An apparatus according to claim 15, wherein said first control message comprises a SIP OPTIONS message and said second control message comprises a SIP 200 OK message.

18. An apparatus according to claim 15, wherein said first control message comprises a SIP OPTIONS message and said second control message comprises a SIP 300 multiple choices message.

19. An apparatus according to claim 15, wherein said first control message comprises a SIP MESSAGE message and said second control message comprises a SIP 300 multiple choices message.

20. An apparatus according to claim 15, wherein said subscriber information related to the requested session comprises an identity of the user control server of the terminating subscriber, wherein the session initiator is configured to initiate the session by sending a request to the user control server of the terminating subscriber.

21. A computer program embodied on a computer-readable storage medium, the computer program configured to controlling a processor to perform a process, the process comprising: receiving a request for session initiation, wherein the session is a session of a real-time media communication service; detecting that a terminating subscriber does not belong to a same subsystem as an originating subscriber; maintaining transit server information that associates a group of subscribers with a transit server, wherein the association is based on identification information on subscriber, and said transit server has access to a subscriber database of a subsystem of the terminating subscriber; determining, in response to detecting that the terminating subscriber does not belong to the same subsystem as the originating subscriber, with identification information on the terminating subscriber included in the request for session initiation, the transit server associated with the terminating subscriber; querying subscriber information related to the requested session with a first control message to the transit server, wherein the first control message comprises parameters of the requested session; and initiating the requested session according to the queried subscriber information.

22. An apparatus, comprising: receiving means for receiving a request for session initiation, wherein the session is a session of a real-time media communication service; detecting means for detecting that a terminating subscriber does not belong to a same subsystem as an originating subscriber; maintaining means for maintaining transit server information that associates a group of subscribers with a transit server, wherein the association is based on identification information on subscriber, and said transit server has access to a subscriber database of a subsystem of the terminating subscriber; determining means for determining, in response to detecting that the terminating subscriber does not belong to the same subsystem as the originating subscriber, with identification information on the terminating subscriber included in the request for session initiation, the transit server associated with the terminating subscriber; and querying means for querying subscriber information related to the requested session with a first control message to the transit server, wherein the first control message comprises parameters of the requested session; and initiating means for initiating the requested session according to the queried subscriber information.

23. An apparatus according to claim 15, wherein said first control message comprises a SIP OPTIONS message and said second control message comprises a SIP 200 OK message.

24. An apparatus according to claim 15, wherein said first control message comprises a SIP OPTIONS message and said second control message comprises a SIP 300 multiple choices message.

25. An apparatus according to claim 15, wherein said first control message comprises a SIP MESSAGE message and said second control message comprises a SIP 300 multiple choices message.

26. An apparatus according to claim 15, wherein the apparatus is configured to determine a pre-defined user control server in the subsystem of the terminating subscriber.

27. An apparatus according to claim 15, wherein the apparatus is configured to determine a pre-defined server in a third subsystem administratively integrated to the subsystem of the terminating subscriber.

28. The computer program of claim 21, the process further comprising:
retrieving, in response to a received control message, the subscriber information from the subscriber database of the subsystem of the terminating subscriber; and
returning a second control message comprising the queried session related subscriber information.

29. The computer program of claim 21, the process further comprising:
establishing said requested session of the real-time media communication service according to a session initiation protocol; and
carrying the real-time media communication service related information in a payload of session initiation protocol messages.

30. The computer program of claim 28, wherein said first control message comprises a SIP OPTIONS message and said second control message comprises a SIP 200 OK message.

31. The computer program of claim 28, wherein said first control message comprises a SIP OPTIONS message and said second control message comprises a SIP 300 multiple choices message.

32. The computer program of claim 28, wherein said first control message comprises a SIP MESSAGE message and said second control message comprises a SIP 300 multiple choices message.

33. The computer program of claim 21, wherein the querying of said subscriber information related to the requested session comprises querying an identity of a user control server of the terminating subscriber, and wherein the initiating the requested session comprises sending a request to the user control server of the terminating subscriber.

34. The computer program of claim 21, wherein the determining of a defined transit server associated with the terminating subscriber comprises determining a pre-defined user control server in the subsystem of the terminating subscriber.

35. The computer program of claim 21, wherein the determining of a defined transit server associated with the terminating subscriber comprises determining a pre-defined server in a third subsystem administratively integrated to the subsystem of the terminating subscriber.

* * * * *